(12) United States Patent
Barski et al.

(10) Patent No.: US 6,778,691 B1
(45) Date of Patent: Aug. 17, 2004

(54) METHOD OF AUTOMATICALLY DETERMINING TONE-SCALE PARAMETERS FOR A DIGITAL IMAGE

(75) Inventors: Lori L. Barski, Mendon, NY (US); Richard L. Van Metter, Washington, DC (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/571,339

(22) Filed: May 16, 2000

(51) Int. Cl.[7] .................................................. G06K 9/00
(52) U.S. Cl. ..................... 382/132; 382/274; 250/587
(58) Field of Search .............................. 382/274, 12 B, 382/130–132, 254; 250/587

(56) References Cited

U.S. PATENT DOCUMENTS 5,012,333 A * 4/1991 Lee et al. ................... 358/520
5,541,028 A    7/1996 Lee
5,633,511 A    5/1997 Lee
5,671,070 A    9/1997 Przybylowicz
6,370,413 B1 * 4/2002 Alvarez et al. ............. 600/407

* cited by examiner

*Primary Examiner*—Amelia M. Au
*Assistant Examiner*—Charles Kim
(74) *Attorney, Agent, or Firm*—William F. Noral

(57) ABSTRACT

A method of automatic determination of preferred tone-scale parameters for digital radiographic images comprising;

providing an input digital medical image and an associated tone-scale LUT (look-up table) determining the associated contrast parameter which will result in preferred equivalent contrast with the tone-scale LUT; determining the toe and shoulder parameters which will result in preferred equivalent toe and shoulder with the associated tone-scale LUT; determining the density shift parameter which will result in preferred equivalent density with the associated tone-scale LUT; and generating a preferred LUT from the results of said three determining steps.

14 Claims, 13 Drawing Sheets

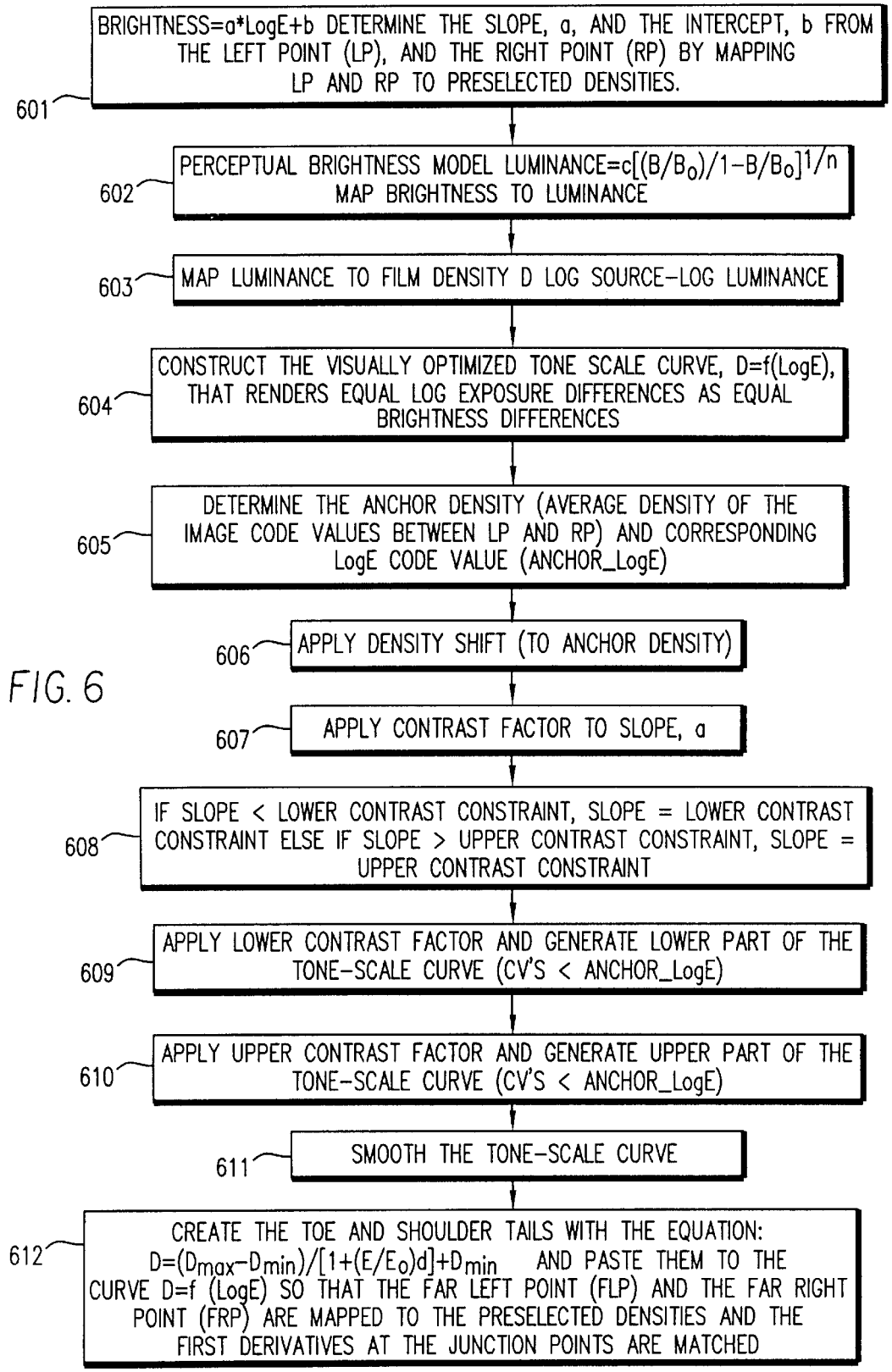

FIG. 6

601: BRIGHTNESS=a*LogE+b DETERMINE THE SLOPE, a, AND THE INTERCEPT, b FROM THE LEFT POINT (LP), AND THE RIGHT POINT (RP) BY MAPPING LP AND RP TO PRESELECTED DENSITIES.

602: PERCEPTUAL BRIGHTNESS MODEL LUMINANCE=$c[(B/B_0)/1-B/B_0]^{1/n}$ MAP BRIGHTNESS TO LUMINANCE

603: MAP LUMINANCE TO FILM DENSITY D LOG SOURCE-LOG LUMINANCE

604: CONSTRUCT THE VISUALLY OPTIMIZED TONE SCALE CURVE, D=f(LogE), THAT RENDERS EQUAL LOG EXPOSURE DIFFERENCES AS EQUAL BRIGHTNESS DIFFERENCES

605: DETERMINE THE ANCHOR DENSITY (AVERAGE DENSITY OF THE IMAGE CODE VALUES BETWEEN LP AND RP) AND CORRESPONDING LogE CODE VALUE (ANCHOR_LogE)

606: APPLY DENSITY SHIFT (TO ANCHOR DENSITY)

607: APPLY CONTRAST FACTOR TO SLOPE, a

608: IF SLOPE < LOWER CONTRAST CONSTRAINT, SLOPE = LOWER CONTRAST CONSTRAINT ELSE IF SLOPE > UPPER CONTRAST CONSTRAINT, SLOPE = UPPER CONTRAST CONSTRAINT

609: APPLY LOWER CONTRAST FACTOR AND GENERATE LOWER PART OF THE TONE-SCALE CURVE (CV'S < ANCHOR_LogE)

610: APPLY UPPER CONTRAST FACTOR AND GENERATE UPPER PART OF THE TONE-SCALE CURVE (CV'S < ANCHOR_LogE)

611: SMOOTH THE TONE-SCALE CURVE

612: CREATE THE TOE AND SHOULDER TAILS WITH THE EQUATION: $D=(D_{max}-D_{min})/[1+(E/E_0)d]+D_{min}$ AND PASTE THEM TO THE CURVE D=f(LogE) SO THAT THE FAR LEFT POINT (FLP) AND THE FAR RIGHT POINT (FRP) ARE MAPPED TO THE PRESELECTED DENSITIES AND THE FIRST DERIVATIVES AT THE JUNCTION POINTS ARE MATCHED

METHOD OF AUTOMATICALLY DETERMINING TONE-SCALE PARAMETERS FOR A DIGITAL IMAGE

FIELD OF THE INVENTION

This invention relates in general to digital medical imaging, and more particularly to a method of automatically determining the parameters used in creating a tone-scale look-up table to enhance a digital medical image for output presentation.

BACKGROUND OF THE INVENTION

The tone-scale of a digital image is responsible for controlling the contrast and brightness characteristics of the image and is manifested in the form of a look-up table (LUT) that maps the input pixel values of the image (e.g., log exposure) to the appropriate output representation such as density or luminance. Automatic tone-scale algorithums are used today for the purpose of determining the optimal tone scale of the image and the parameters which control these algorithums are many. U.S Pat. No. 5,633,511, issued May 27, 1997, inventors Lee et al., discloses a tone scale algorithum which utilizes image activity measures as a means of determining the appropriate region of interest and then constructs a visually optimized tone-scale. This new image activity measures algorithm uses an entirely different set of parameters than the prior methods which used input code value histograms and image independent tone scale curves. In order to make the installation of the image activity algorithm transparent to the users, it is necessary to determine what parameters would achieve the same tone scale, and therefore the same overall look, as the old tone-scale algorithum. In a similar fashion, a tone-scale of unknown origin can be approximated using this method to determine appropriate parameters.

SUMMARY OF THE INVENTION

According to the present invention, there is provided a method of automatic determination of preferred tone-scale parameters for digital radiographic images comprising of:

providing an input digital medical image and an associated tone-scale LUT (a look-up table) associated; determining the contrast parameter which will result in preferred equivalent contrast with the associated tone-scale LUT; determining the toe and shoulder parameters which will result in preferred equivalent toe and shoulder with the associated tone-scale LUT; determining the density shift parameter which will result in preferred equivalent density with the associated tone-scale LUT; and generating a preferred LUT from the results of said three determining steps.

ADVANTAGEOUS EFFECT OF THE INVENTION

The invention has the following advantages.

1. Automatic determination of parameters to be used in creating a preferred tone scale in the form of a LUT.

2. A framework is provided for applying the technique to a suite of digital medical images.

BRIEF DESCRIPTION OF THE DRAWINGS

FIG. 6 is a block diagram showing a modified procedure for constructing the preferred tone scale LUT using the upper and lower contrast parameters and the upper and lower contrast constraint parameters.

DETAILED DESCRIPTION OF THE INVENTION

Figures 15, 16:
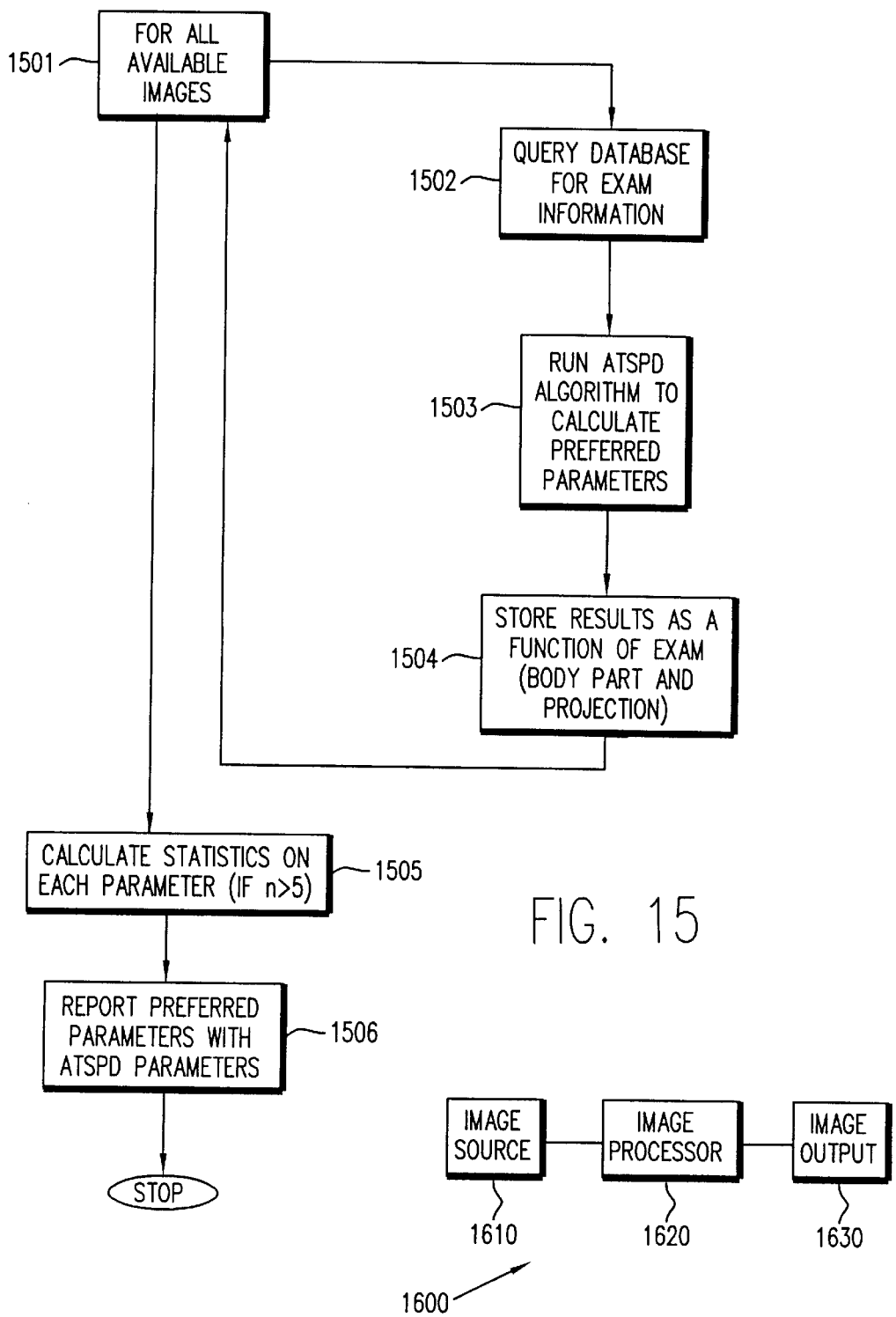
FIG. 15 is a block diagram of a preferred embodiment of the automatic tone-scale parameter determination alogrithum to be used on a plurality of images and associated LUTs.
FIG. 16 is a block diagram of a medical imaging system incorporating the present invention.

Referring now to FIG. 16, there is shown a medical imaging system 1600 incorporating the present invention. As shown, image source 1610 is the source for one or more medical images each of which has an associated LUT for converting the image code values into corresponding density or luminance of an output image. Source 1610 can be a medical image storage system, a medical image generator (e.g., CT, MRI, PET, US diagnostic scanner, medical image film digitizer, computed radiography, direct radiography), a medical image transmission systems (telephone, cable, satellite, internet, intranet) or the like.

The digital medical image from source 1610 is processed according to the present invention in image processor 1620. Processor 1620 preferably is a digital computer but can include hardware and firmware systems. A digital computer includes a digital processor, storage, a display, input devices such as, mouse, keyboard, touch screen and output.

The processed digital image is sent to image output 1630 such as an electronic display (CRT, LCD) or hard copy printer (laser, ink jet, electrophotographic, thermal, dye transfer).

As described below, the method of the invention can be carried out in system 1600.

The Automatic Tone-Scale Parameter Determination Algorithum (ATSPD)

In its most general form, the purpose of the ATSPD algorithum is to automatically determine tone-scale parameters from any image and associated LUT of known origin. Many different tone-scale algorithum are used across the field of computed radiography (CR) and direct radiology (DR), all of which result in acceptable images. Once a radiologist or clinician becomes accustomed to a particular image"look", they prefer to keep the look, regardless of which vendor is providing the final displayed image. It is therefore an objective that for an image from a known source and with an associated LUT, one can obtain a processed version of the image which very closely approximates the preferred "look".

Figure 1:
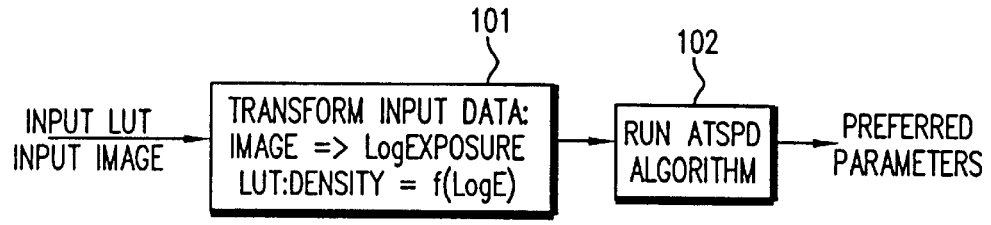
FIG. 1 is a block diagram of an embodiment of the method of the present invention.

FIG. 1 is a simple block diagram which captures this general method. Given an image and it's corresponding LUT, we must first transform the image data (101) into log exposure (logE) space and the LUT data into density as a function of loge exposure (logE). With this transformation process completed, we can then run the ATSPD algorithm (102), which is described in detail in this patent. Thus, it is assumed that the input data to the ATSPD algorithum is image data in log exposure space and the corresponding LUT serves as a mapping process from log exposure space to density.

Again referring to FIG. 1, the transformation process requires prior knowledge of the type of image data that is being processed, as well as the nature of the display LUT. In CR, raw image data is usually related to the irradation that the imaging plate receives and is in the units of log exposure (logE), exposure (E), or square root of exposure (sqrtE). For example, if one knows apriori that the incoming image data is of the form sqrtE, the image data can be squared and then the base 101 logarithm done in order to put the data in logE space.

Display LUTs are usually related to the display medium being used to present the image: luminance for CRT type monitors, or density for printers. Transforming data from luminance space to density space is discussed in U.S Pat. No. 5,671,070, issued Sep. 23, 1997, inventors Pryzbylowicz et al., and is dependent upon multiple factors such as the gamma of the CRT, the ambient lighting, and the dynamic range of both the CRT and the printer to name a few. Because it is not the intention here to teach or invent methods of transforming the image data and the LUTs, it will be appreciated that such transformations are known in the art and that these transformations are a prerequisite to the ATSPD method taught herein.

Overview of Preferred Parameters Used to Develop the Visually Optimized Tone Scale This invention expands upon the techniques disclosed in U.S Pat. No. 5,633,511, issued May 27, 1997, inventors Lee et al. and U.S Pat. No. 5,541,028, issued Jul. 30, 1996, inventors Lee et al. The tone scale method taught in these patents is fully parameterized. In addition to the methods and parameters of these patents, four additional parameters are taught in this invention. Table 1 lists all the parameters and the effect which the parameter has on the resulting tone scale.

TABLE 1

Parameters used in the preferred algorithum.

| PARAMETER | EFFECT |
| --- | --- |
| Density Shift | shifts the curve to result in lighter/darker light |
| Contrast | changes the slope of the curve to increase/decrease contrast |
| Upper contrast* | changes the slope of the upper part of the curve to increase/decrease contrast in the darker regions |
| Lower contrast* | changes the slope of the lower part of the curve to increase/decrease contrast in the lighter regions |
| Toe | controls the amount of roll-off in the light regions |
| Shoulder | controls the amount of roll-off in the dark regions |
| Left point density | controls the density at which the left point is mapped |
| Right point density | controls the density at which the right point is mapped |
| Maximum contrast constraint* | constrains the upper end of the contrast limit |
| Minimum contrast constraint* | constrains the lower end of the contrast limit |
| * | new parameter taught in this patent |

A database is used to establish the correct parameters with which to render images of a particular exam, e.g., Anterior-Posterior (AP) chest. Therefore, it is necessary to pre-determine what parameter set will provide the optimal rendering for the radiologist. When the above inventions are supplanting another method, it is important to automatically determine the preferred parameters which would result in the same rendering as the older method so as to minimize disruption and confusion to the radiologist.

There are two parts to this invention. The first part focuses on the method for automatically determining the required preferred parameters to yield the same LUT as the associated LUT. The second part focuses on the implementation of first part for the purpose of applying the Part I methods automatically to determine preferred parameters on a plurality of exam types.

This preferred embodiment is applicable to the Kodak Digital Science CR 400 Quality Control Workstation (QCW).

Figure 2:
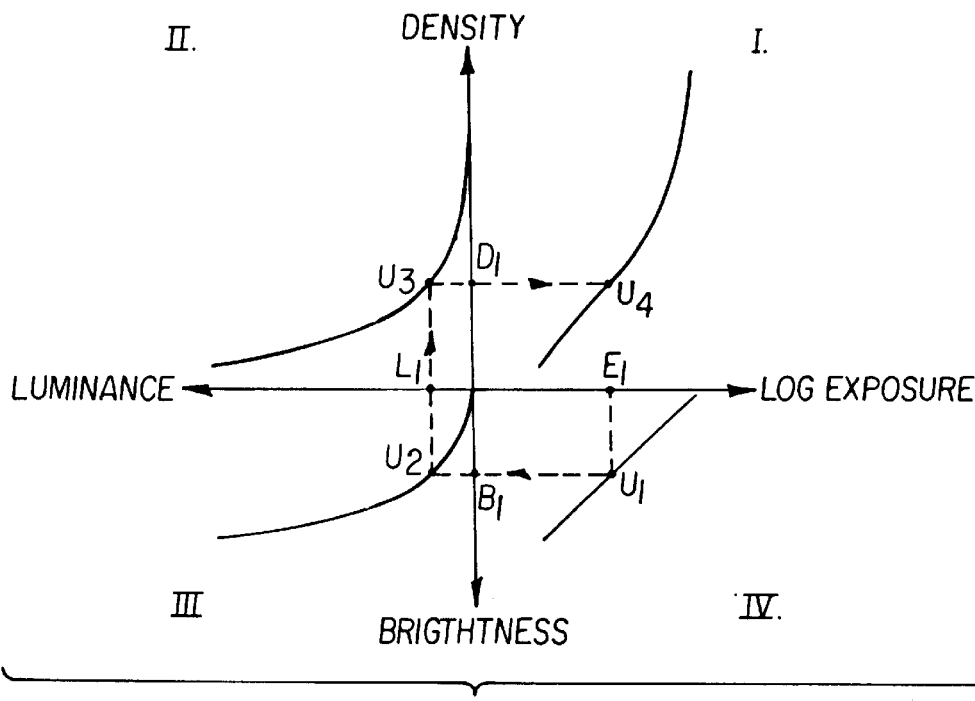
FIG. 2 is a diagrammatic view of how a visually optimized tone-scale LUT is constructed.
Figure 3:
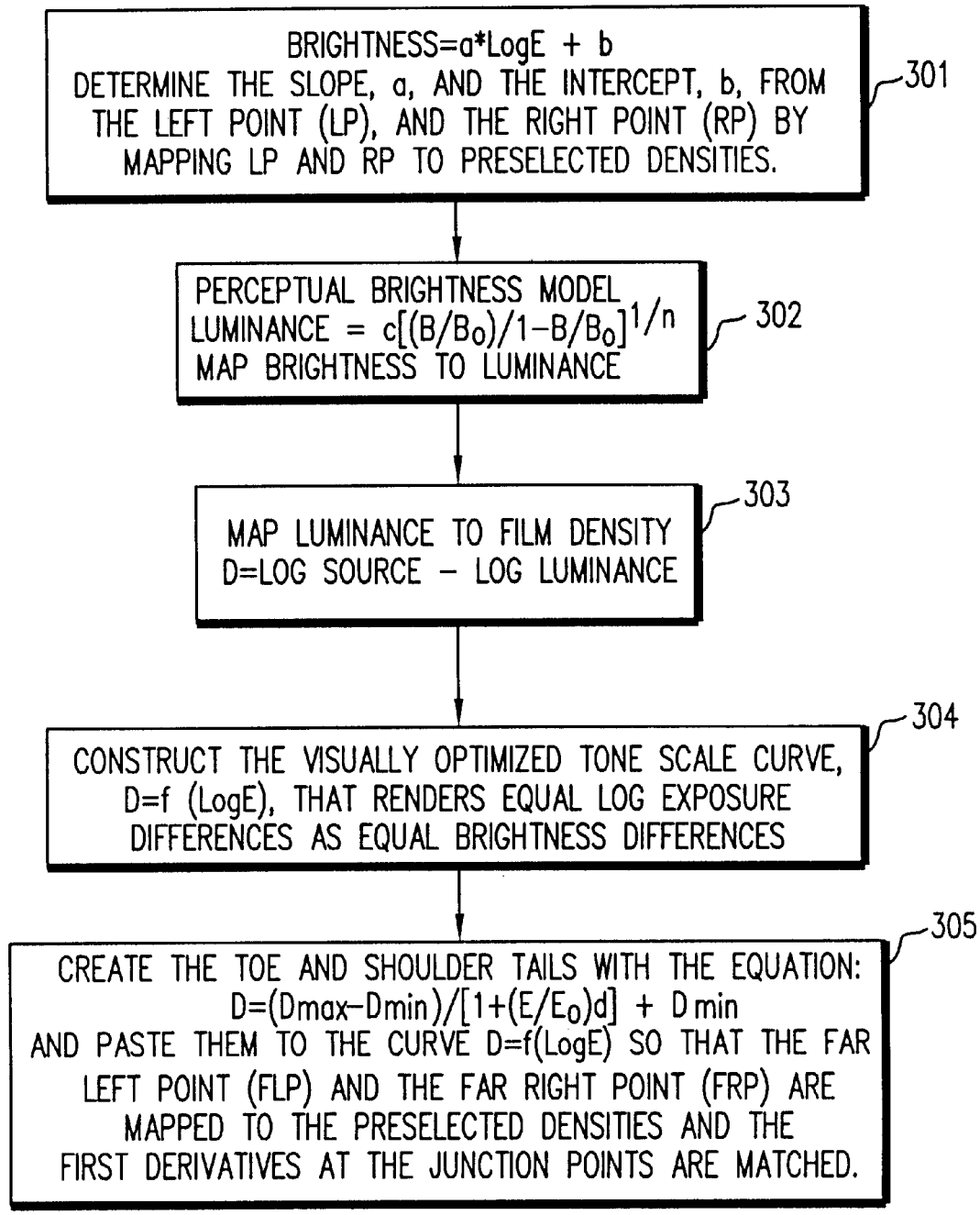
FIG. 3 is a block diagram showing a procedure for constructing the LUT of FIG. 2.

FIG. 2 is a diagrammatic view of how the preferred tone scale curve is constructed and FIG. 3 is a block diagram showing a procedure for constructing the tone-scale curve. As taught in U.S Pat. No. 5,633,511, 4 characteristic points, referred to as far-left point (FLP), left point (LP), right point (RP) and far-right point (FRP) are determined based upon image activity measures. As taught in U.S Pat. No. 5,541,028, the linear brightness vs. LogE curve in FIG. 1, quadrant IV (also referred to as the perceptual linear relationship) is determined my mapping LP and RP to two pre-selected density values (left point density and right point density, respectively) (FIG. 3, box 301). Next, brightness is mapped to luminance using there perceptual brightness model (FIG. 2, quadrant III; FIG. 3, box 302). Then, luminance is mapped to film density (FIG. 2, quadrant II, FIG. 3 box 303). Combining all three mappings, the visually optimized tone-scale is constructed (FIG. 2, quadrant I, FIG. 3 box 304). Next, the toe and shoulder of the curve are generated by an analytical equation and then"pasted" to the visually optimized tone-scale curve generated according to FIG. 3 (box 305).

Figure 4:
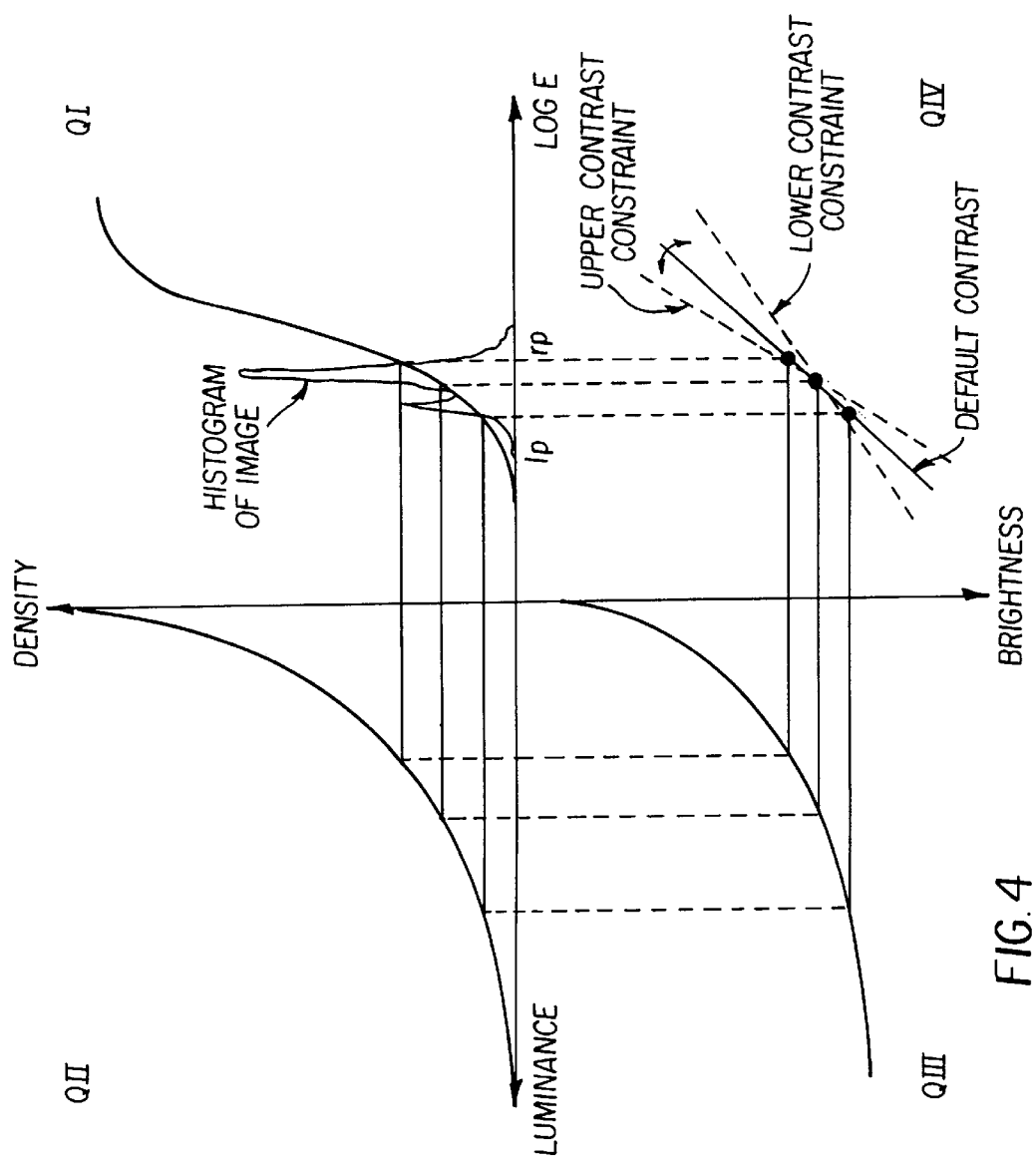
FIG. 4 is a diagrammatic view of how the upper and lower contrast parameters influence the construction of the tone-scale.

Four new parameters are taught in this invention which enable additional control in constructing the tone-scale curve. The first two are the upper and lower contrast constraints. FIG. 4 is a diagrammatic view of how the upper and lower contrast constraint parameters influence the construction of the tone-scale curve. Upon completion of the determination of the left and right points, the slope and intercept of the perceptual linear relationship is determined. The upper and lower contrast constraints restrict the range and slope value that are allowed in this process, as shown in quadrant IV of FIG. 4.

Figure 5:
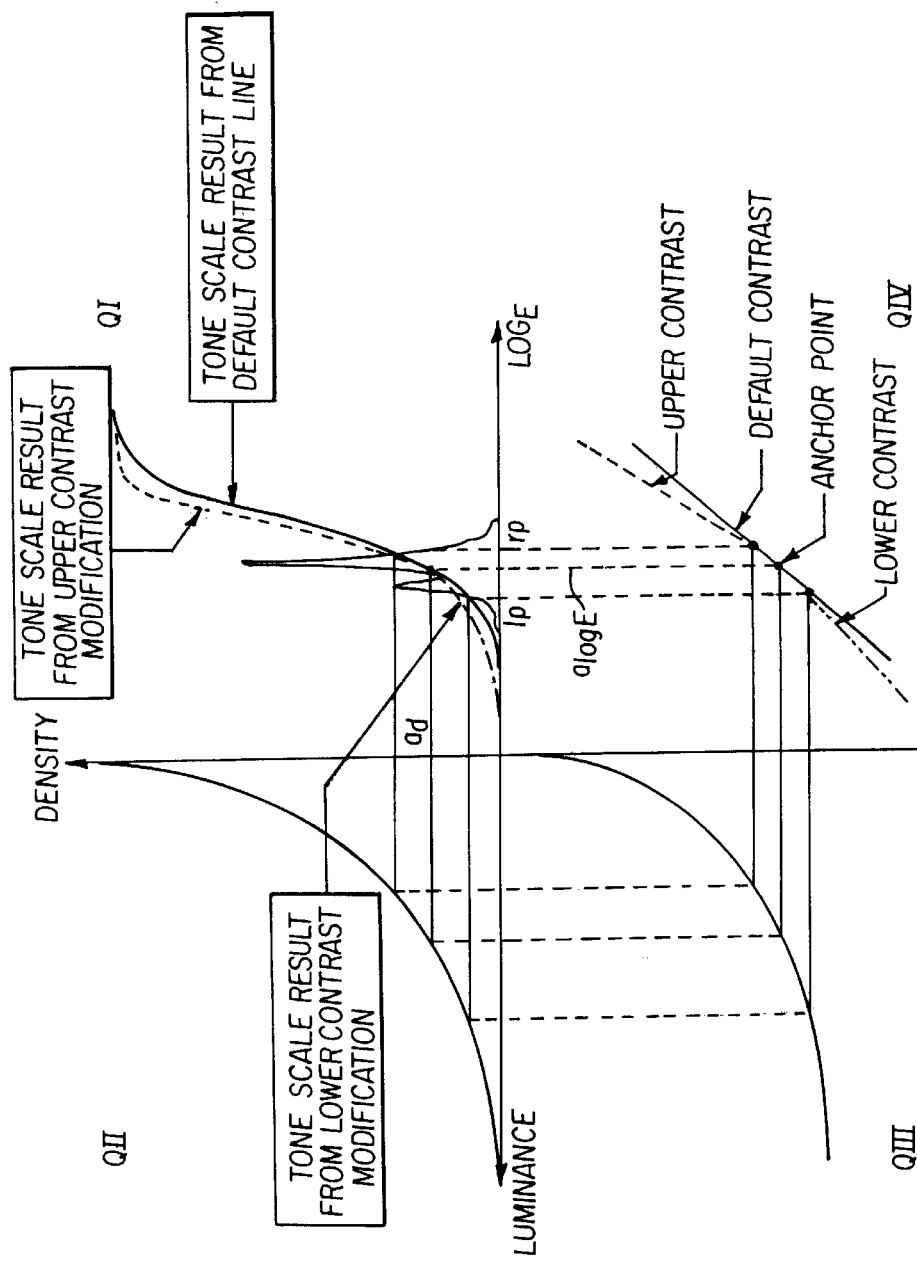
FIG. 5 is a diagrammatic view of how the upper and lower contrast constraint parameters influence the construction of the tone-scale.

The second two new parameters taught in this invention are upper and lower contrast. Upon completing the initial construction of the tone-scale, and referring to FIG. 5, the anchor density, ad is calculated. This corresponds to the average density of all pixels in the image that range between left point, after being mapped through the initial tone-scale. The code value which corresponds to this average density is found and referred to as a $_{logE}$. The anchor point is then the vertical intersection of the $a_{logE}$ point and the linear brightness vs. LogE curve in quadrant IV. At this point, the perceptual linear relationship is"bent" where the upper and lower portions are adjusted independently, per the user's preferences. The upper adjustment is referred to as the upper contrast and the lower adjustment is referred to as the lower contrast. Adjustment of the upper and lower contrasts is relative to the initial perceptual linear relationship so that a value greater than 1.0 will increase the contrast and a value less than 1.0 will decrease the contrast. In quadrant IV of FIG. 5, the upper contrast adjustment shown corresponds to a value greater than 1.0 and the lower contrast adjustment corresponds to a value less than 1.0. The result of these adjustments are shown as the dashed line in quadrant I.

In light of these new parameters, the procedure for constructing the tone-scale is slightly modified, and shown in FIG. 6. As mentioned previously, after the four points, far left, left, right and far right, are found based upon the activity histogram analysis taught in U.S Pat. No. 5,633,511, the perceptual linear relationship (601) is found by determining the slope and intercept. The perceptual brightness mapping is performed (602), the luminance to density mapping is done (603), and the initial version of the perceptual tone-scale is constructed (604). With the first version of the tone-scale available, we then utilize the preferred parameters to customize the tone-scale. The anchor density is determined (605) and a density shift is applied (606). The slope of the line in quadrant IV is scaled by the contrast factor (607) and then checked against the minimum and maximum contrast constraints (608). The lower contrast factor is then applied to the lower half of the quadrant IV line and the lower part of the tone-scale curve is determined (609). Similarly, the upper contrast factor is applied to the upper half of the quadrant IV line and the upper part of the tone-scale curve is determined (610). Due to the upper half being developed independent of the lower half, the two parts are combined and smoothed (611). Finally the toe and shoulder are calculated and applied to the tone-scale (612). The order in which this process is done is most important to the subsequent information taught in this disclosure. It is important to understand that the upper and lower contrast factors have precedence over the contrast constraints in the development of the tone scale, and that the contrast constraints have precedence over the contrast factor. Also, the density shift adjustment is fully independent of the contrast manipulations.

Part I—The Automatic Tone-Scale Parameter Determination (ATSPD) Algorithm

Figure 7:
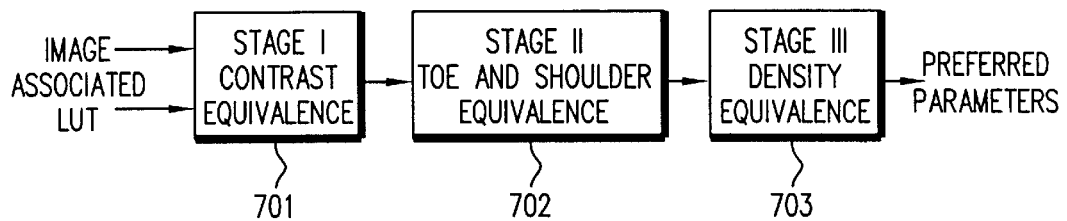
FIG. 7 is a block diagram of the automatic tone-scale parameter determination algorithm.

The purpose of the automatic tone-scale parameter determination algorithm is to reverse-engineer the tone-scale so that for any given LUT which maps logE input code values to density output code values (or another output function related to density), we can determine automatically what preferred parameters would achieve the same look. The general approach for the algorithm is based upon three Stages, as shown in FIG. 7. These Stages consist of: making contrast equivalent (701), making toe and shoulder equivalent (702), and making overall density equivalent (703).

Stage I—Contrast Equivalence

The first Stage (701) matches contrast, or average gradient, which is measured over the mid densities of the tone-scale curve. The motivation for this first step is that we eliminate the errors which might occur if we tried to match overall lightness/darkness or toe and shoulder first. Another motivation for performing contrast equivalence first is that this is consistent with the methods taught in the preferred patents—the contrast, or slope if the tone-scale curve, is the first attribute determined. Once contrast equivalence is obtained, it is an easier task to determine the remaining parameters. As a result of this first Stage, we will determine what the appropriate contrast, upper contrast constraint and lower contrast parameters should be.

Figure 8:
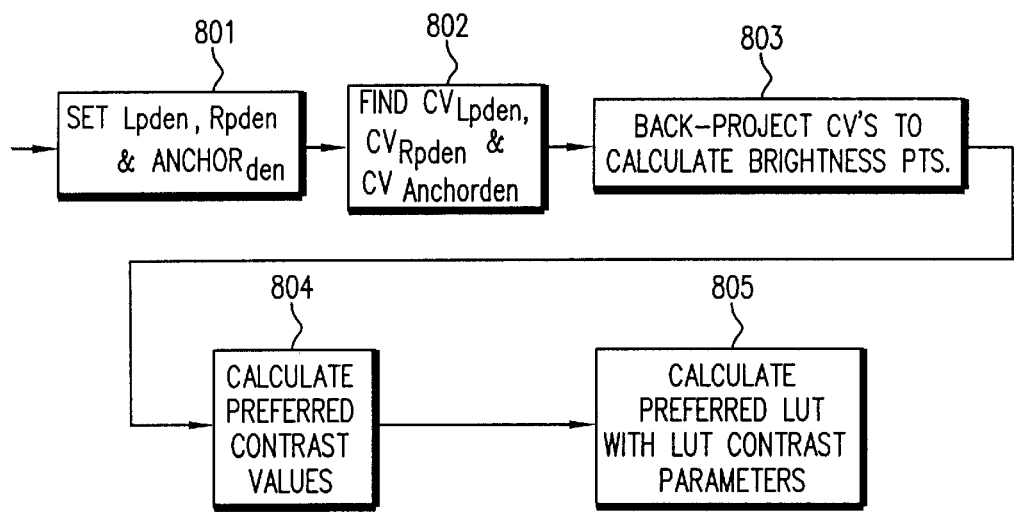
FIG. 8 is a block diagram of the process of Stage 1.
Figure 9:
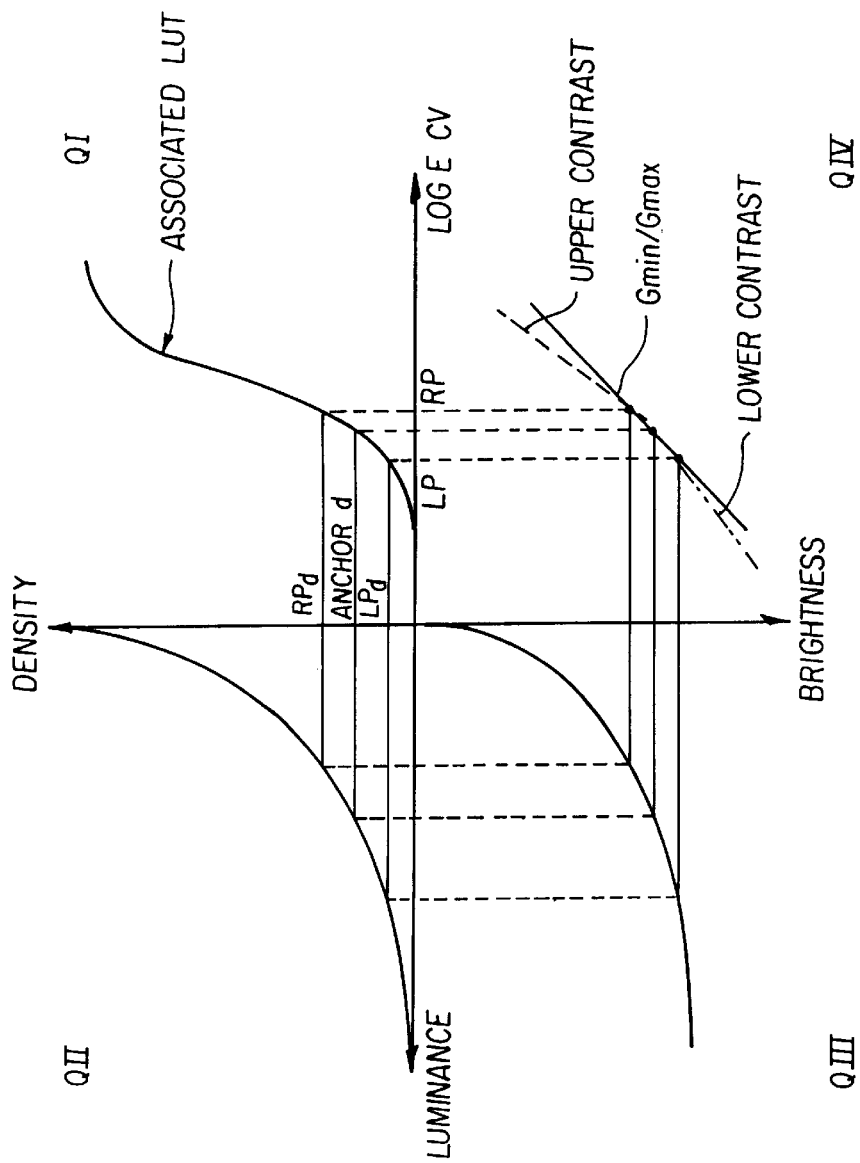
FIG. 9 is a diagrammatic view of how the Stage I contrast equivalence is determined.

In order to achieve our goal, we need to make some assumptions and characterize the contrast of associated LUT in light of the preferred methodology of perceptual linearization. Thus, we need to take the mid-density portion of the associated LUT and calculate the perceptual linear relationship that corresponds to these densities. FIG. 8 is a function block diagram of the process for making the contrasts of the associated LUT and preferred LUT equivalent and FIG. 9 is a diagrammatic view of the method of Stage 1. First, we define 3 density values that facilitate calculation of contrast (801). These are the left point density (LP $_{den}$), right point density (RP $_{den}$), and the anchor density (Anchor $_{den}$). In our preferred embodiment, these values are 0.8, 1.6, and 1.21 respectively. We then determine from the associated LUT, shown in quadrant I of FIG. 9, the input code value which corresponds to these three densities in order to determine the CV $_{LP\ den}$, CV $_{RP\ den}$ and CV $_{Anchor\ den}$ (802). These logE points are half of the necessary information. We also take the three densities assumed in quadrant I of FIG. 9 and map them (803) through the density/luminance and luminance/brightness relationships in order to determine the corresponding brightness of the three density points. This is the other half of the necessary information. Therefore, for each density point and its corresponding logE value and brightness, we can calculate the slope of the lines connecting the three points (804). The lower contrast is the slope of the line connecting (CV $_{LP\ den}$, BLP) and (CV $_{Anchor\ den}$, B $_{anchor}$). The upper contrast is the slope of the line connecting (CV $_{Anchor\ den}$, B $_{anchor}$) and (CV $_{RP\ den}$, B $_{RP}$). The overall contrast which determines the minimum contrast constraint (G $_{min}$) and maximum contrast constraint (G $_{max}$) is the slope of the line connecting (CV $_{LP\ den}$) abd (CV $_{RP\ den}$). The upper contrast factor is then determined by dividing the upper contrast by the overall contrast and the lower contrast factor is determnined by dividing the lower contrast by the overall contrast.

Stage II—Toe and Shoulder Equivalence

Prior to discussing the method for achieving toe and shoulder equivalence, it is necessary to discuss four descriptors which are used to characterize the shape of the tone-scale curve. These measurements are based upon descriptors commonly used to describe the shape of H & D curves in conventional screen/film combinations with the assumption that the dynamic range of the film is from 0.21 to 3.0. Note that if a different printer dynamic range is utilized, e.g., reflection printing, the densities should be scaled accordingly.

Figure 10A:
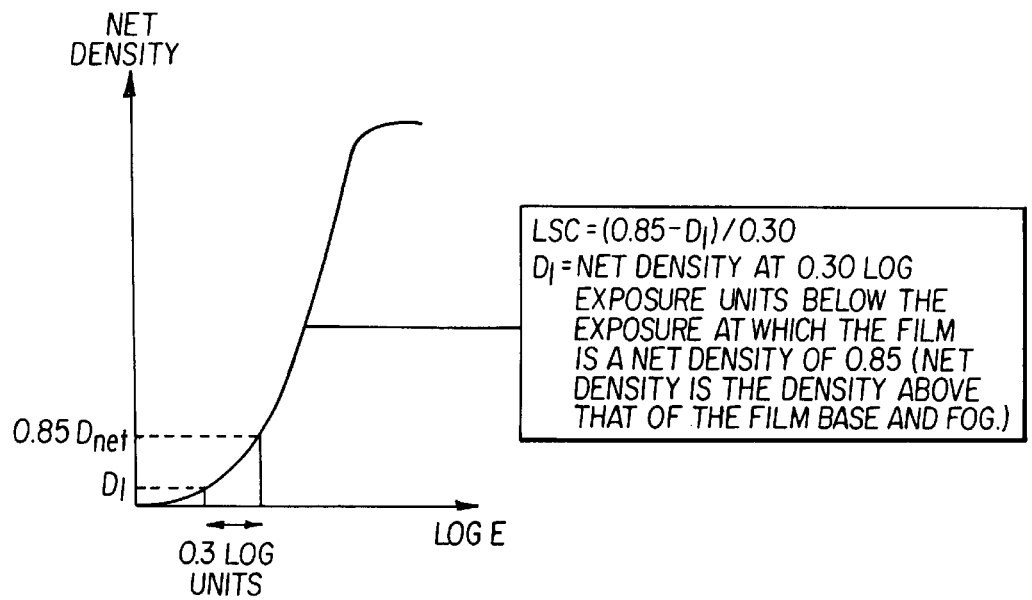
FIG. 10a is a diagram of how lower scale contrast (LSC) is computed.
Figure 10B:
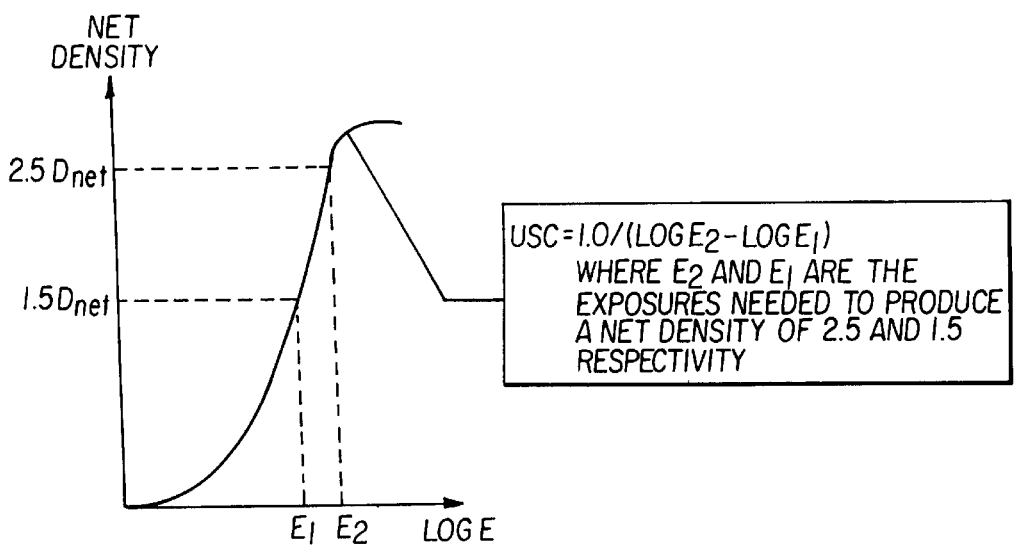
FIG. 10b is a diagram of how upper scale contrast (USC) is computed.
Figure 10C:
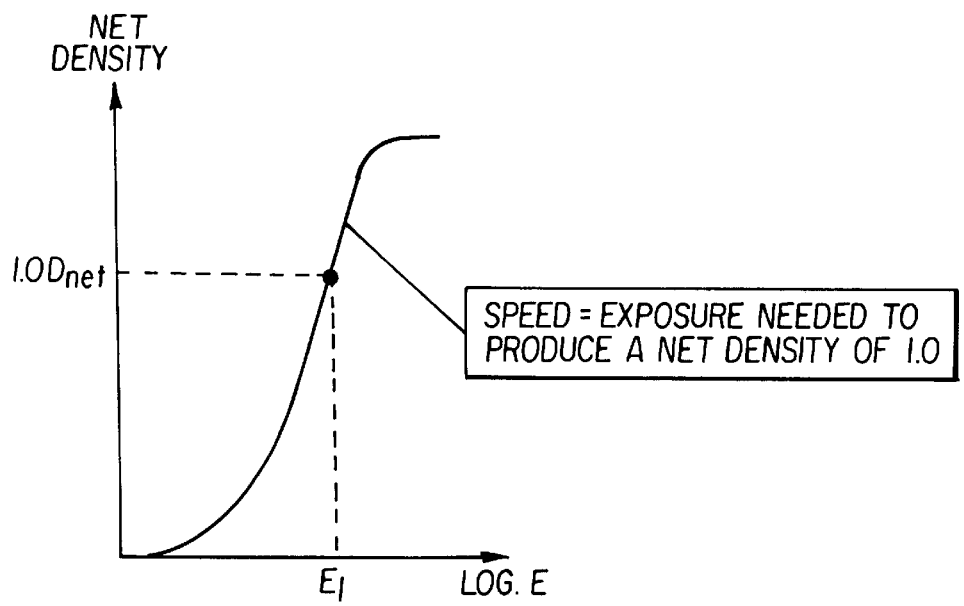
FIG. 10c is a diagram of how speed is computed.
Figure 10D:
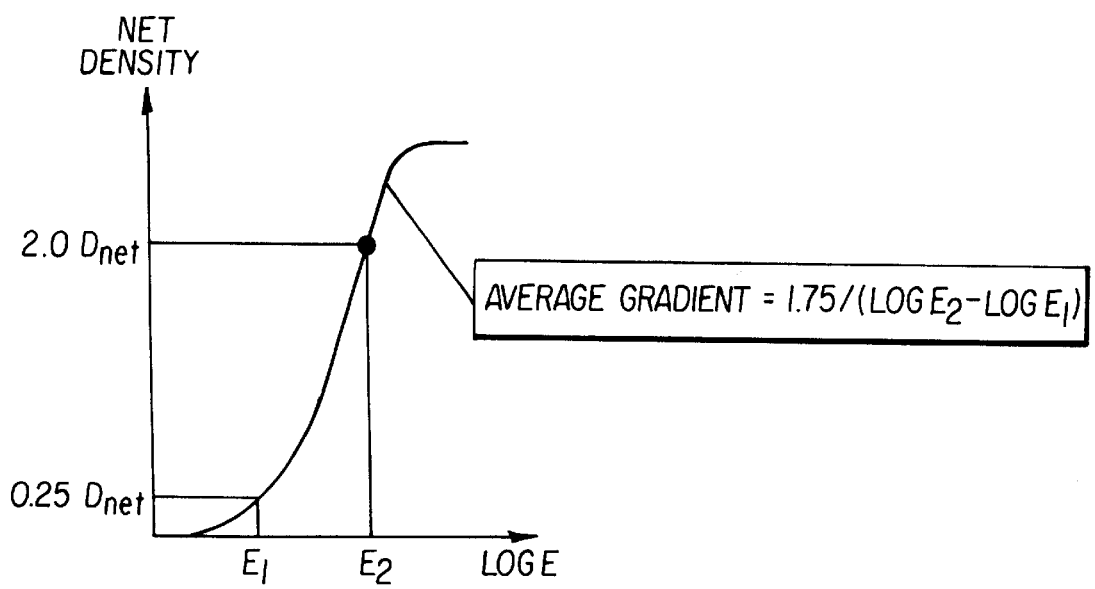
FIG. 10d is a diagram of how average gradient, or contrast is computed.

FIGS. 10a–10d are diagrammatic views of the descriptors. FIG. 10a presents the definition of lower scale contrast (LSC), which measures "toe" contrast. FIG. 10b presents the definition of upper scale contrast (USC), which measures "shoulder" contrast. FIG. 10c presents the definition of speed, which will be used to equate overall density, and FIG. 10d presents the definition of average contrast, or gradient. Together, theses four descriptions are used in both Stages II and III of the ATSPD algorithm.

Figure 11:
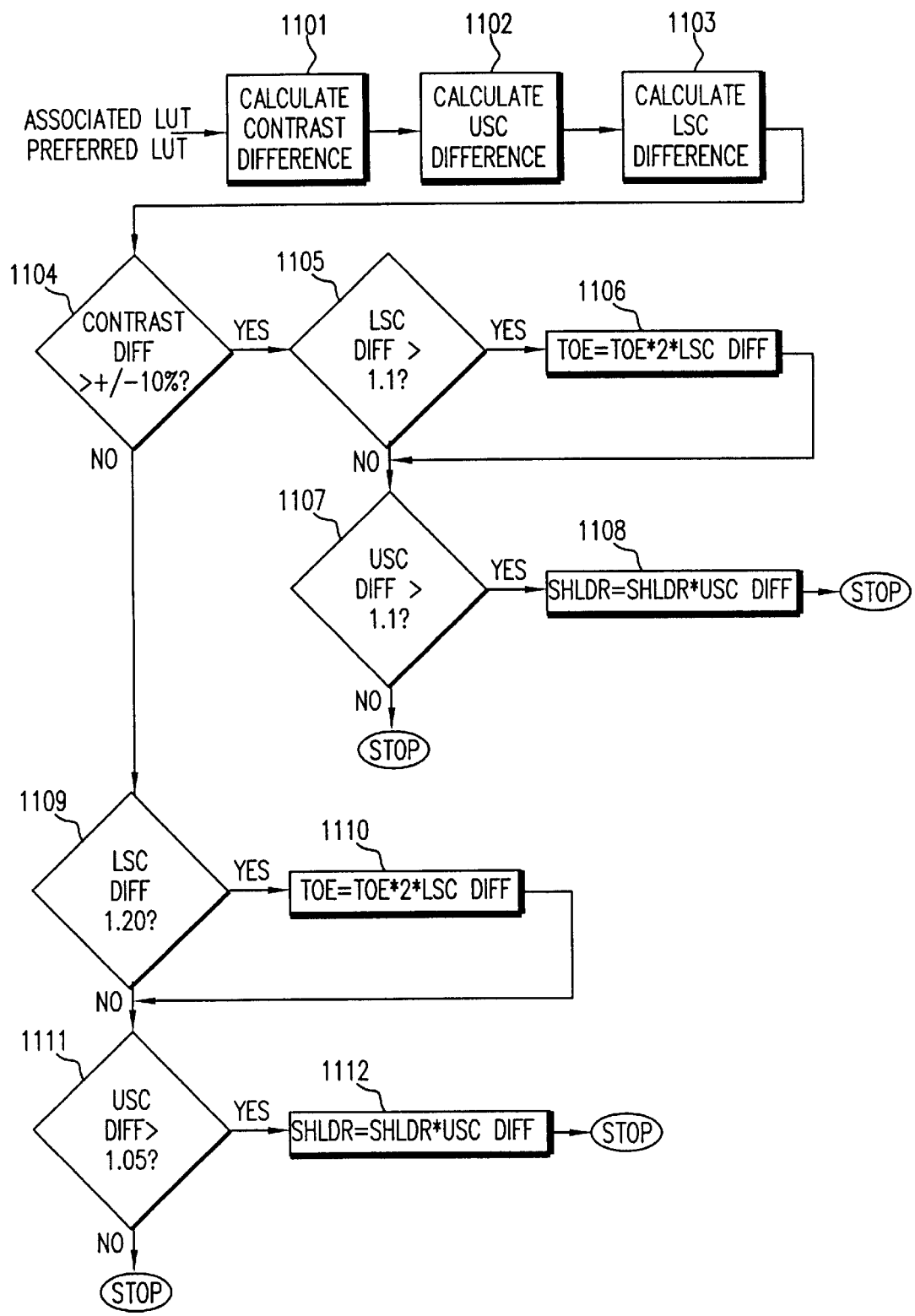
FIG. 11 is a block diagram of the process of Stage II.

FIG. 11 is a function block diagram of the process of Stage II. Inputs to this process are the associated LUT and the first iteration of the preferred LUT, i.e., the result of preferred processing with the contrast equivalence step performed. In order to obtain this LUT, the preferred processing must be performed such that the contrast constraints are set to the overall contrast measurement of Stage I and that the upper and lower contrast factors are used (also determined in Stage I). Similarly, the preferred processing (with control constraints) must be performed with initial toe and shoulder settings at some initial value. In order to simplify adjustments of the toe and shoulder parameters, the values are set to their minimum setting. This facilitates adjustments in increasing direction. Given these two LUTs, calculate the contrast (FIG. 10C) of the associated LUT and preferred LUT and compute their percent difference as a ratio of the preferred contrast to the associated contrast (1101). Similarly, calculate the USC of both the associated and preferred LUTs and compute their percent difference (1102), as well as the LSC (1103). These three measures serve as factors which determine which decision path is chosen in FIG. 11.

If the absolute difference in contrast is greater that 10% (1104) and if the LSC difference is >1.1 (1105), this indicates that the preferred toe contrast is significantly higher than the associated toe contrast. By increasing the preferred toe parameter, the net effect would be a decrease in LSC. Therefore, the toe parameter is scaled to twice the toe value currently used, multiplied by the LSC difference (1106). However, if the LSC is not significantly different between the preferred associated LUTs and the USC difference is greater than 1.1 (1107), this indicates that the preferred shoulder contrast is significantly higher than the associated shoulder contrast. By increasing the preferred shoulder parameter the net effect is a decrease in USC. Therefore, the shoulder parameter is scaled by the USC difference (1108). Note that when the LSC difference is <1, nothing more can be done to make the LSC of the preferred toe contrast any greater. Likewise for the case where USC differential is <than 0.

On the condition where the average gradients are nearly the same but the LSC difference is significant (>1.20) (1109), the toe parameter is scaled to twice the original toe parameter times the LSC difference (1110), or else if the USC difference is significant (<1.05) (1111), the shoulder parameter is scaled by the difference (112). Otherwise, the parameters are left unchanged.

Stage III—Density Equivalence

Figure 12:
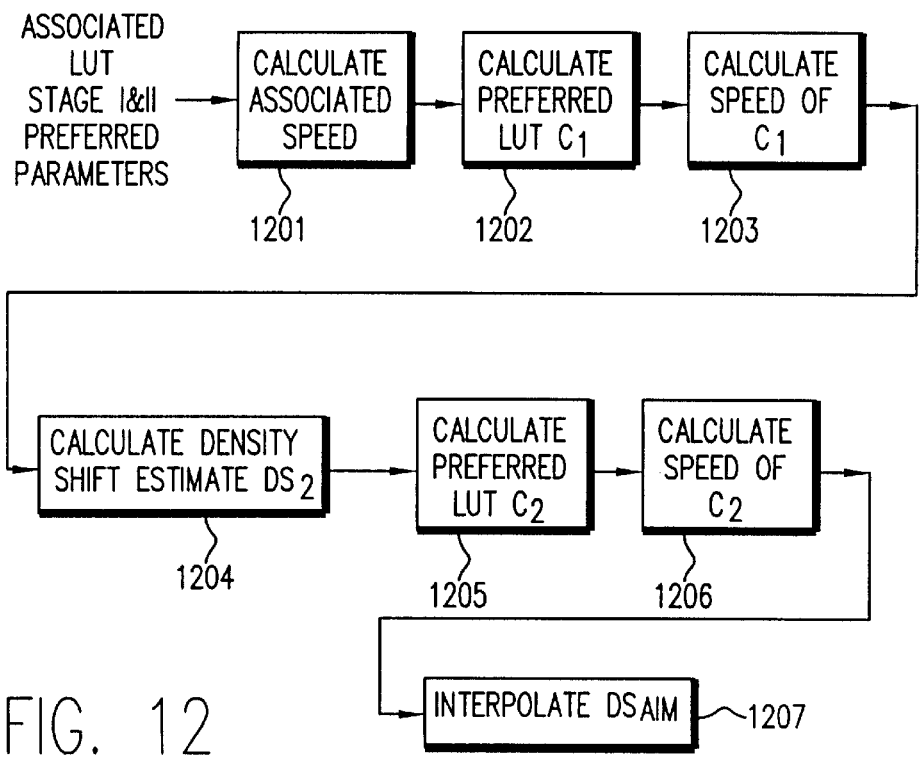
FIG. 12 is a block diagram of the process of Stage III.
Figure 13:
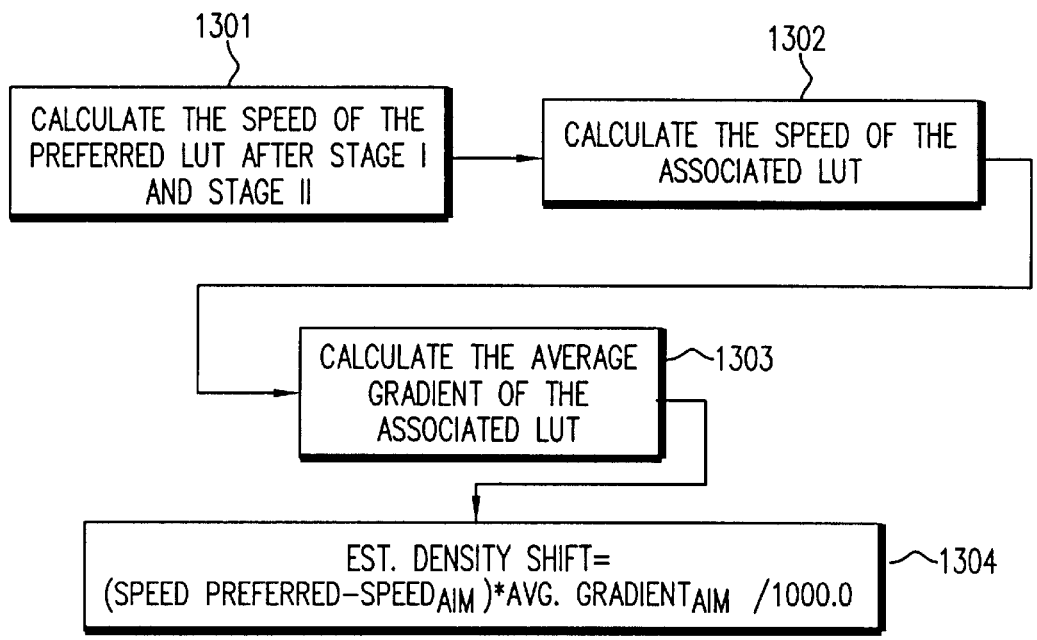
FIG. 13 is a block diagram of how the first density shift parameter is estimated.

FIG. 12 is a function block diagram of the process for making the overall density of the two LUTs equivalent which is based upon an interpolation technique. Inputs to Stage III processing are the associated LUT and the preferred parameters which have resulted from Stage I and Stage II processing, namely the contrast parameters (contrast factor =1.0, upper contrast, lower contrast, upper contrast constraint and lower contrast constraint) and the toe and shoulder parameters.

Figure 14:
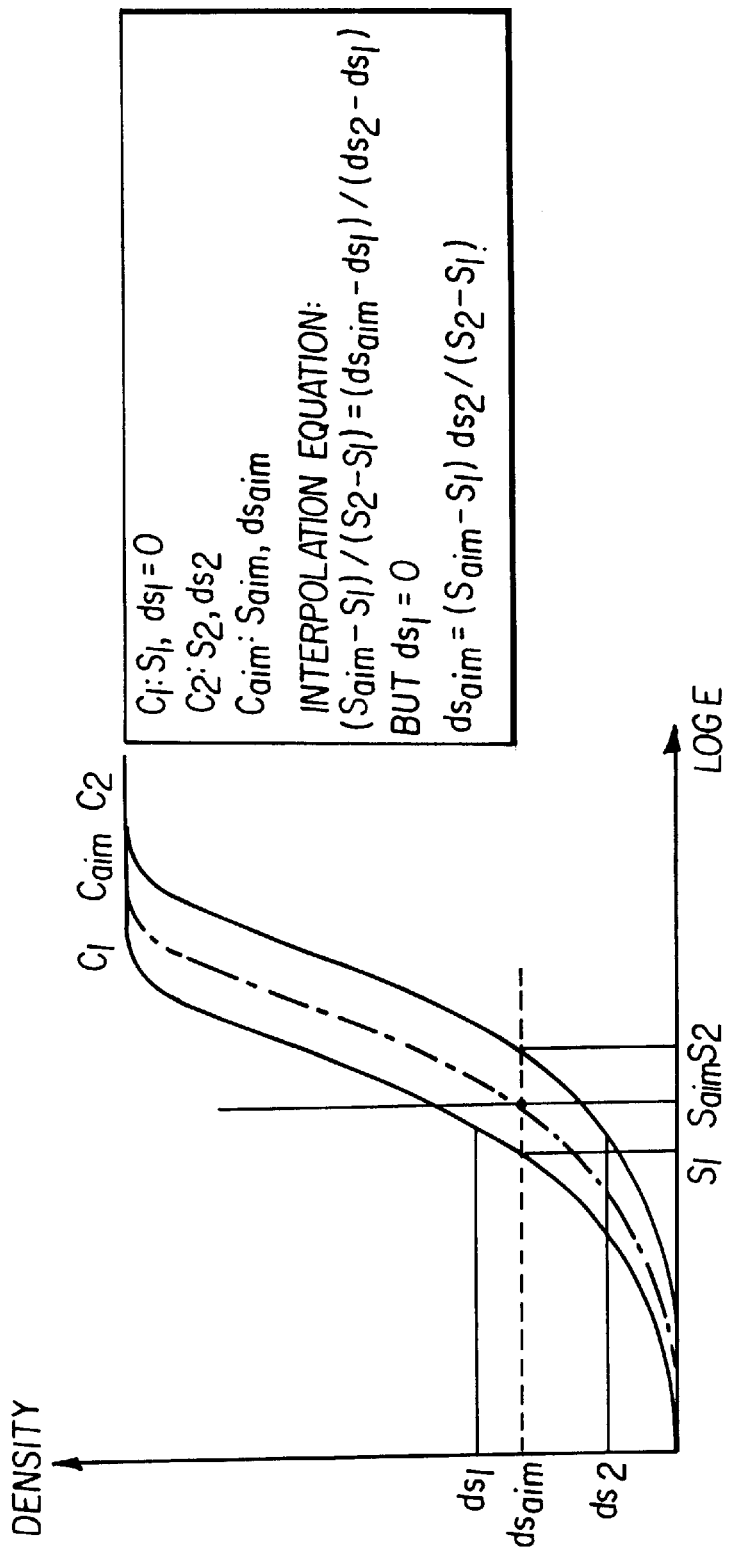
FIG. 14 is a diagrammatic view of how the Stage III density equivalence is determined.

The speed (see FIG. 10c, 1201) of the associated LUT is calculated and the first version of the preferred LUT is determined using the results of Stage I and Stage II processing. The first preferred LUT is referred to as LUT Cl (1202). The speed of LUT Cl is determined (1203) from which a density shift estimate (1204), $ds_2$, is made. (Description of the calculation of the $ds_2$ estimate is provided in the next paragraph). Using this density shift estimate, the preferred LUT is recalculated and is referred to as $C_2$ (1205). The speed of the $C_2$ LUT is determined (FIG. 10c, 1206) and then the required density shift necessary to match the associated LUT is computed by interpolation as shown in FIG. 14.

The determination of the initial $ds_2$ estimate (1204) is based upon the differences in speed between the $C_1$ LUT and the associated LUT, as shown in FIG. 11. The speed of the Cl LUT (1301), the speed of the associated LUT (1302), and the average gradient of the associated LUT (FIG. 10d, 1303) are calculated. The estimated density shift parameter, dsl is calculated as the difference between the preferred LUT speeds times the average gradient of the associated LUT divided by 1000.0 (1304).

Part II—The Preferred Embodiment of The ATSPD Algorithum

As mentioned earlier, it is the desire of this invention to automatically determine preferred parameters which will result in the same "look" as what a radiologist is use to seeing. This preferred embodiment is specifically targeted to the Kodak Digital Science CR 400 Quality Control Workstation (QCW), where images, on the order of several hundreds, are stored on a disk drive. In addition to the storage of images, the QCW also contains a database that retains information about each image such as its physical location on disk and the exam information (i.e., body part and projection). In order for the goal of creating the same "look" to be successful, several requirements must be met. First, there must be an abundant supply of images of the same exam type so that statistics of the parameters can be determined. Second, because the images are stored as raw bit-maps with no exam information, we must query the database in order to match up the exam image file with the required body part and projection information so that we can store the results of the ATSPD algorithm as a function of exam.

FIG. 15 is a function block diagram describing the preferred embodiment of the ATSPD algorithm. For all images stored on disk (1501), we query the database for the exam (body part and projection) information (1502). The ATSPD algorithm is run using the associated LUT (which is stored in the same directory as the raw image data) in order to determine the preferred parameters which will result in the same LUT (1503). The resulting parameters are then saved as a function of exam (1504). This process continues for all images on the system. Once it is complete, the saved parameters as a function of exam are sorted, and for each body part and projection, if there are greater than 5 examples, we report the preferred parameters for that exam.

Table 2 below describes the statistics which are use to report the various parameters. Depending upon the parameter, either the median, the mean or the +/−1σ confidence interval is reported. For example, if there are greater than 5 LATERAL ANKLE exams, we calculate the median density shift preferred parameter of the lateral ankle exam. Later, we'll use this value as the default density shift parameter when processing future lateral ankle exams. The reasoning for using the mean in some instances and median in other instances is related to the nature of the estimation properties of these two statistics: the median is less affected by outliners. Thus, for parameters which are most sensitive to outliers and a bigger error in the estimate, we use the median, otherwise, we use the mean, It is certainly conceivable and acceptable to switch the type of statistics used in deciding how to select the various parameters. We selected these based upon the performance of the method on hundreds of images.

TABLE II

Statistics utilized to report the various parameters.

| Parameter | Statistic Used |
|---|---|
| Density Shift | median |
| Contrast Factor | always = 1.0 |
| Upper Contrast Factor | median |
| Lower Contrast Factor | median |
| Minimum Contrast Constraint | lower $1\sigma$ confidence interval on the contrast statistics |
| Medium Contrast Constraint | upper $1\sigma$ confidence interval on the contrast statistic |
| Toe | mean |
| Shoulder | mean |
| Left point density | median |
| Right point density | median |

Table II—Statistics utilized to report the various parameters.

In instances where parameters for a few specific exams are required and time is restricted so that one can not process all images on the system, the processing script can also be modified to only include the desired exam categories.

The invention has been described in detail with particular reference to certain preferred embodiments thereof, but it will be understood that variations and modifications can be effected within the spirit and scope of the invention.

PARTS LIST 101 image data
102 ATSPD algorithum
301 left and right point density
302 perceptual brightness model
303 luminance mapped to film density
304 visual optimized tone scale curve
305 toe and shoulder equation
601 perpetual linear relationship
602 perceptual brightness mapping
603 luminance to density mapping
604 perceptual tone-scale
605 anchor density
606 density shift
607 contrast factors
608 contrast constraints
609 (lower contrast) tone-scale curve
610 (upper contrast) tone-scale curve
611 smooth tone-scale curve
612 toe and shoulder calculation
701 contrast equivalence
702 toe and shoulder equivalence
703 density equivalence
801 calculate contrast
802 find CV
803 calculate brightness points
804 preferred contrast values
805 preferred LUT with associated LUT contrast
1101 calculate contrast
1102 calculate USC
1103 calculate LSC -continued

PARTS LIST 1104 contrast difference
1105 LSC difference
1106 toe calculation
1107 USC calculation
1108 shoulder calculation
1109 LSC difference
1110 toe difference
1111 USC difference
1112 shoulder difference
1201 calculate associated speed
1202 calculate preferred LUT $C_1$
1203 calculate speed of $C_1$
1204 calculate density shift estimate
1205 calculate preferred LUT $C_2$
1206 calculate speed of $C_2$
1207 interpolate $ds_{aim}$
1301 preferred LUT after Stage I & II
1302 speed of associated LUT
1303 average gradient of the associated LUT
1304 estimate density shift
1501 images stored on disk
1502 database for the exam
1503 determine preferred parameters
1504 parameters saved as a function of exam
1505 calculate statistics for each parameter
1506 report preferred parameters with ATSPD parameters
1610 image source
1620 image processor
1630 image output

What is claimed is:

1. A method of automatic determination of preferred tone-scale parameters for digital radiographic images, the method comprising the steps of:

providing an input digital medical image and an associated tone-scale LUT (look-up table);

using the input image and the associated LUT to determine a contrast parameter which will result in A-preferred equivalent contrast with the associated tone-scale LUT;

using the input image and the associated LUT to determine a contrast parameters which will result in a preferred equivalent toe and shoulder with the associated tone-scale LUT;

using the input image and the associated LUT to determine a density parameter which will result in a preferred equivalent density with the associated tone-scale LUT; and storing the preferred equivalent contrast. toe and shoulder. and density parameters for application in an algorithm employed to produce a modified digital medical image having a preferred look.

2. The method of claim 1 wherein said providing includes transforming the input digital medical image to represent log exposure values and transforming the associated tone-scale LUT to map log exposure values to density code values.

3. A method of automatic determination of preferred tone-scale parameters for digital radiographic images, the method comprising the steps of:

providing an input digital medical image and an associated tone-scale LUT (look-up table);

determining a contrast parameter which will result in a preferred equivalent contrast with the tone-scale LUT;

determining a toe and shoulder parameter which will result in a preferred equivalent toe and shoulder with the associated tone-scale LUT;

determining a density parameter which will result in a preferred equivalent density with the associated tone-scale LUT; and generating a preferred LUT from the results of said three determining steps, wherein said determining the contrast parameter includes setting left point density to a pre-selected value; setting the right point density to a pre-selected value; setting the anchor density to a pre-selected value; determining the log exposure value which inversely maps the left point density to log exposure; determining the log exposure value which inversely maps the right point density to log exposure; determining the anchor exposure value which inversely maps the anchor point density to log exposure; mapping the left point density value through the density vs. luminance curve and then through the luminance vs. brightness curve and selecting the point at which the left point log exposure value and the left point brightness value intersect; mapping the right point density value through the density vs. luminance curve and then through the luminance vs. brightness curve and selecting the point at which the right point log exposure value and the right point brightness value intersect; determining the slope of the line between the left and right points in the log exposure vs. brightness quadrant which determines overall contrast; mapping the anchor point density value through the density vs. luminance curve and then through the luminance vs. brightness curve and selecting the point at which the anchor point log exposure value and the anchor point brightness values intersect; determining the slope of the line between the anchor and left points in the log exposure vs. brightness quadrant which defines lower contrast; determining the slope of the line between the anchor and right points in the log exposure vs. brightness quadrant which defines upper contrast; determining the ratio between the upper contrast; and determining the ratio between the lower contrast and the overall contrast.

4. The method of claim 3 wherein said determining toe and shoulder parameters includes constructing the preferred LUT using said contrast parameters; determining the contrast difference ratio between the preferred LUT and the associated LUT; determining the upper scale contrast of the preferred and associated LUTs; calculating the difference ratio in upper scale contrast between the preferred and associated LUTs; determining the lower scale contrast of preferred and associated LUTs; calculating the difference ratio in lower scale contrast between the preferred and associated LUTs; calculating the new toe value as twice the original default toe value times the lower scale difference if the contrast difference is greater than 10% and the lower scale difference is greater than 10%; calculating the new shoulder value as the product of the original shoulder value and the upper scale contrast difference if the contrast difference is greater than 10% and the lower scale contrast difference is less than 10% and the upper scale contrast difference is greater than 10%; calculating the new toe value as twice the original default toe value times the lower scale difference if the contrast difference is less than 10% and the lower scale contrast difference is greater than 25%; calculating the new shoulder value as the product of the original shoulder value and the upper scale contrast difference if the contrast difference is less than 10% and the upper scale contrast difference is greater than 5%; otherwise, leaving the toe and shoulder values as the original default values.

5. The method of claim 4 wherein said determining density shift parameters includes the steps of calculating the preferred LUT using said preferred contrast parameters and said preferred toe and shoulder parameters; calculating the speed of the associated LUT; calculating the speed of the preferred LUT; calculating a density shift estimate; calculating another preferred LUT using the density shift estimate; calculating the speed of the preferred LUT based upon the density shift speed estimate; and interpolating the density shift value which would result in the same density as the associated LUT.

6. The method of claim 5 wherein said determining density shift estimate includes calculating the speed of the preferred LUT which result from said methods of calculating the speed of the associated LUT; calculating the average gradient of the LUT; calculating the density shift estimate using density shift estimate=(speed preferred—speed associated)*average gradient associated/1000.0.

7. The method claimed in claim 3 wherein a plurality of images are processed comprising:

querying a database for examination information; running the method of claim 3 to determine preferred parameters; storing the preferred parameters as a function of examination information; upon completion of processing said plurality of images, determining statistics on each of the preferred parameters where a sample size greater than 5 is available; and reporting the preferred parameters as a function of examination type.

8. The method of claim 7 wherein said determining statistics includes calculating the median of the density shift values; calculating the median of the upper contrast factor; calculating the median of the lower contrast factor; calculating the lower 1 sigma confidence interval from the contrast statistics; calculating the upper one sigma confidence interval from the contrast statistics; calculating the mean toe value; calculating the mean shoulder value; and calculating the median left point density value and the median right point density value.

9. The method of claim 1 wherein the step of determining the contrast parameter includes the steps of:

setting left point density to a pre-selected value;

setting right point density to a pre-selected value;

setting anchor density to a pre-selected value;

determining the log exposure value which inversely maps the left point density to log exposure;

determining the log exposure value which inversely maps the right point density to log exposure;

determining the anchor exposure value which inversely maps the anchor point density to log exposure;

mapping the left point density value through the density vs. luminance curve and then through the luminance vs. brightness curve and selecting the point at which the left point log exposure value and the left point brightness value intersect;

mapping the right point density value through the density vs. luminance curve and then through the luminance vs. brightness curve and selecting the point at which the right point log exposure value and the right point brightness value intersect;

determining the slope of the line between the left and right points in the log exposure vs. brightness quadrant which determines overall contrast;

mapping the anchor point density value through the density vs. luminance curve and then through the luminance vs. brightness curve and selecting the point at which the anchor point log exposure value and the anchor point brightness values intersect;

determining the slope of the line between the anchor and left points in the log exposure vs. brightness quadrant which defines lower contrast;

determining the slope of the line between the anchor and right points in the log exposure vs. brightness quadrant which defines upper contrast;

determining the ratio between the upper contrast, and the overall contrast determining the ratio between the lower contrast and the overall contrast.

10. The method of claim 1 wherein the step of determining the toe and shoulder parameters includes the steps of:

constructing a preferred LUT using said contrast parameter;

determining a contrast difference ratio between the preferred LUT and the associated LUT;

determining an upper-scale contrast of the preferred and associated LUTs;

calculating a difference ratio in upper-scale contrast between the preferred and associated LUTs;

determining a lower-scale contrast of the preferred and associated LUTs;

calculating a difference ratio in lower-scale contrast between the preferred and associated LUTs;

calculating a new toe value as twice an original default toe value times the lower-scale contrast difference if the contrast difference is greater than a contrast difference threshold and the lower-scale contrast difference is greater than a first lower-scale contrast threshold;

calculating a new shoulder value as the product of an original default shoulder value and the upper-scale contrast difference if the contrast difference is greater than the contrast difference threshold and the lower-scale contrast difference is less than the first lower-scale contrast threshold and the upper-scale contrast difference is greater than a first upper-scale contrast threshold;

calculating the new toe value as twice the original default toe value times the lower-scale contrast difference if the contrast difference is less than the contrast difference threshold and the lower-scale contrast difference is greater than a second lower-scale contrast threshold; and calculating a new shoulder value as the product of the original shoulder value and the upper-scale contrast difference if the contrast difference is less than the contrast difference threshold and the upper-scale contrast difference is greater than a second upper-scale contrast; otherwise, leaving the toe and shoulder values as the original default values.

11. The method of claim 1 wherein the step of determining the density parameter includes the steps of:

calculating a first preferred LUT using said preferred contrast parameter, and said preferred toe and shoulder parameters;

calculating a density shift estimate;

calculating a second preferred LUT using the density shift estimate;

calculating a speed of the second preferred LUT based on the density shift estimate; and calculating the density shift value which would result in the same density as the associated LUT by interpolation.

12. The method of claim 11 wherein the step of determining the density shift estimate includes the steps of:

calculating the speed of the first preferred LUT which result from calculating the speed of the associated LUTV calculating the average gradient of the associated LUT; and calculating the density shift estimate using density shift estimate=(speed preferred—speed associated)*average gradient associated/1000.0.

13. The method claimed in claim 1 wherein a plurality of images are processed, the method further comprises the steps of:

querying a database for examination information;

running the method of claim 1 to determine the preferred parameters;

storing the preferred parameters as a function of examination information;

on completion of processing said plurality of images, determining statistics on each of the preferred parameters where a sample size greater than 5 is available; and reporting the preferred parameters as a function of examination type.

14. The method of claim 13 wherein the step of determining statistics includes the steps of.

calculating a median of density shift values;

calculating a median of upper contrast factor;

calculating a median of a lower contrast factor;

calculating a lower 1 sigma confidence interval from the contrast statistics;

calculating a upper one sigma confidence interval from the contrast statistics;

calculating a mean toe value;

calculating a mean shoulder value; and calculating a median left point density value and a median right point density value.

* * * * *